United States Patent
Nam et al.

(10) Patent No.: US 10,619,762 B2
(45) Date of Patent: Apr. 14, 2020

(54) APPARATUS AND METHOD FOR DETECTING PIPING ALIGNMENT USING IMAGE INFORMATION AND LASER SENSOR

(71) Applicant: Mokpo National Maritime University Industry—Academic Cooperation Foundation, Jeollanam-do (KR)

(72) Inventors: Taek-kun Nam, Jeollanam-do (KR); Jin-man Kim, Jeollanam-do (KR); Heon-hui Kim, Jeollanam-do (KR); Jae-jung Kim, Jeollanam-do (KR)

(73) Assignee: Mokpo National Maritime University Industry-Academic Cooperation Foundation, Jeollanam-do (KR)

( * ) Notice: Subject to any disclaimer, the term of this patent is extended or adjusted under 35 U.S.C. 154(b) by 0 days.

(21) Appl. No.: 16/428,866

(22) Filed: May 31, 2019

(65) Prior Publication Data

US 2019/0285197 A1  Sep. 19, 2019

Related U.S. Application Data

(62) Division of application No. 15/684,864, filed on Aug. 23, 2017, now Pat. No. 10,465,821.

(30) Foreign Application Priority Data

Oct. 22, 2016  (KR) .................. 10-2016-0176662

(51) Int. Cl.
*F16L 1/10* (2006.01)
*G01B 11/27* (2006.01)
(Continued)

(52) U.S. Cl.
CPC .............. *F16L 1/10* (2013.01); *G01B 11/272* (2013.01); *B21D 19/00* (2013.01); *E21B 19/16* (2013.01); *F16L 1/235* (2013.01); *F16L 13/02* (2013.01)

(58) Field of Classification Search
CPC . F16L 1/10; B21D 39/04; B21D 19/00; E21B 19/16; G01B 11/272
See application file for complete search history.

(56) References Cited

U.S. PATENT DOCUMENTS

| | | | | |
|---|---|---|---|---|
| 2011/0079584 A1* | 4/2011 | Hees | ........................ | E21B 19/16 219/61 |
| 2013/0259577 A1* | 10/2013 | Hansen | .................... | B63C 11/52 405/158 |
| 2014/0259597 A1* | 9/2014 | Lavalley | ................ | B21D 19/10 29/407.1 |

FOREIGN PATENT DOCUMENTS

| KR | 10-2012-0051265 | 5/2012 |
|---|---|---|
| KR | 10-2013-0081938 | 7/2013 |

* cited by examiner

*Primary Examiner* — Maurice C Smith
(74) *Attorney, Agent, or Firm* — Intellectual Property Law Group LLP

(57) ABSTRACT

The present invention provides an apparatus and a method for detecting a piping alignment using image information and laser sensors capable of precisely and accurately measuring and aligning the alignment of the entire pipes. The apparatus includes: a fixed plate installed on a base stage and having a reference pipe located thereon; a movable plate installed on the base stage along three axes to face the reference pipe and has an aligning pipe located thereon; a circular stage installed between the reference and aligning pipes and is configured to rotate and move along three axes so as to detect levelness and deformations of the reference and aligning pipes; a laser sensor and an imaging device installed on an upper side of the circular stage; and a (Continued)

controller configured to control the laser sensor and the imaging device and determine an alignment of the aligning pipe.

5 Claims, 4 Drawing Sheets

(51) Int. Cl.
*F16L 13/02* (2006.01)
*F16L 1/235* (2006.01)
*E21B 19/16* (2006.01)
*B21D 19/00* (2006.01)

APPARATUS AND METHOD FOR DETECTING PIPING ALIGNMENT USING IMAGE INFORMATION AND LASER SENSOR

CROSS-REFERENCE TO RELATED APPLICATIONS

This application is a divisional of U.S. patent application Ser. No. 15/684,864, filed on Aug. 23, 2017, which further claims priority to Korean Patent Application No. 10-2016-0176662, filed on Dec. 22, 2016 in the Korean Intellectual Property Office, the entire disclosures of which are incorporated herein by reference.

BACKGROUND OF THE INVENTION

1. Field of the Invention

The present invention relates to an apparatus and a method for detecting a piping alignment using image information and a laser sensor, and more particularly, to an apparatus and a method for detecting a piping alignment using image information and a laser sensor, which may automatically align various medium and large pipes, so as to allow an operator to easily carry out a welding work.

2. Description of the Related Art

A lot of pipings are required for various plants and ships. In particular, for the ships, all of seawater, fresh water, lubricants and fuel oil are transported and supplied through the piping. Currently, such a piping has a lot of difficulties for manual work by an operator due to a load and a volume thereof in a case of small, medium and large pipings.

In a case of a thick plate for a ship, an alignment work is performed using a transporter and a crane for welding, and in the case of the large piping, rails, or the like are installed to perform the alignment work. However, when installing a large-sized rail in a workplace, it is difficult to carry out the alignment work such as a pipe having various sizes and types due to a disadvantage of occupying a lot of work space and the uniformly determined rails.

Furthermore, when using a jig, or the like, there is a limitation on the size and type of the target pipe, and even when using a clamping mechanism, it is necessary to acquire proficiency, and it takes a lot of time to perform the alignment work, as well as it is difficult to correctly detect and ascertain the alignment.

As conventional techniques in relation with the present invention, there are patent documents such as Korean Patent Laid-Open Publication No. 10-2012-0051265 published on May 22, 2012 and entitled a concentricity alignment jig of large pipes for a centering machine welding equipment, and Korean Patent Laid-Open Publication No. 10-2013-0081938 published on Jul. 18, 1010 and entitled an aligning apparatus for flange holes of a pipe.

SUMMARY OF THE INVENTION

In consideration of the above-mentioned circumstances, it is an object of the present invention to provide an apparatus and a method for detecting a piping alignment using image information and a laser sensor, which may accurately and precisely measure the alignment of an entire piping and align the piping while rotating and moving a ring-type stage on which the laser sensor and an imaging device are mounted.

As a technical means in order to accomplish the above-described object, according to an aspect of the present invention, there is provided an apparatus for detecting a piping alignment using image information and a laser sensor, the apparatus including: a fixed plate installed on a base stage and having a reference pipe located thereon; a movable plate installed on the base stage so as to face the reference pipe at an interval in such a way of being capable of moving along three axes, and having an aligning pipe located thereon; a circular stage which is installed between the reference pipe and the aligning pipe, is moved so as to coincide a center thereof with a center of the reference pipe, and is configured to rotate and move along three axes so as to detect a levelness and a deformation of the reference pipe and the aligning pipe, respectively; a laser sensor and an imaging device which are installed on an upper side of the circular stage; and a controller configured to control the laser sensor and the imaging device, receive a distance value of a gap between the reference pipe and the aligning pipe measured by the laser sensor to collect data, and calculate a corresponding relationship between the image information acquired from the imaging device and distance information of the gap to determine an alignment of the aligning pipe.

Herein, the fixed plate and the movable plate may be formed as a block having a "V-shaped" upper surface within an angle of 140° to 160° so as to increase a contact area between the upper surface and the reference pipe or the aligning pipe, respectively.

The imaging device may include a charge coupled device (CCD) image sensor, or a complementary metal oxide semiconductor (CMOS) image sensor.

The controller may include a display device connected to the circular stage via a wired or wireless connection, and the display device displays the levelness of the pipes and the distance of the gap therebetween by performing a coordinate conversion of a corresponding relation between the image information and the distance information.

Further, according to another aspect of the present invention, there is provided a method for detecting a piping alignment using image information and a laser sensor, the method including the steps of: coinciding a center point of a reference pipe located on a fixed plate with a center point of a circular stage provided with a laser sensor and an imaging device through rotation and movement along three axes of the circular stage; measuring a levelness and a deformation of the reference pipe while the circular stage rotates 360° and moves on an X-axis along the fixed plate with the center points of the circular stage and the reference pipe being coincided with each other; aligning a center point of an aligning pipe located on a movable plate with the center point of the reference pipe by coinciding the center points thereof with each other by moving the movable plate along three axes using center point coordinate information of the circular stage; measuring a levelness and a deformation of the aligning pipe while the circular stage rotates 360° and moves on an X-axis along the movable plate with the center points of the circular stage and the aligning pipe being coincided with each other; moving the aligning pipe in close proximity to a position arbitrarily defined by a user toward the reference pipe; positioning the circular stage to a connection point between the aligning pipe and the reference pipe facing in close proximity to each other, then confirming cutting angles of cutting planes of the aligning pipe and the reference pipe by a controller through the 360° rotation operation of the circular stage; and inputting a minimum proximity distance between the aligning pipe and the reference pipe according to conditions of the cutting planes of the aligning pipe and the reference pipe, and moving the aligning pipe in an X-axis direction based on the input value.

In the step of coinciding the center point of the reference pipe located on the fixed plate with the center point of the circular stage, the center point of the circular stage may be coincided with the center point of the reference pipe, while the circular stage rotates 360° about the reference pipe and circular stage moves along three axes, using a distance measured by the laser sensor.

In the step of measuring the levelness and the deformation of the reference pipe, while the circular stage is repeatedly moved along the reference pipe by a preset distance, a distance between the aligning pipe and the reference pipe located inside the circular body may be determined to measure the levelness or deformation of the reference pipe.

In the step of measuring the levelness and the deformation of the aligning pipe, while the circular stage is repeatedly moved along the aligning pipe by a preset distance, a distance between the reference pipe and the aligning pipe located inside the circular body may be determined to measure the levelness or deformation of the aligning pipe.

The method may further include, after the step of moving the aligning pipe in close proximity to a position arbitrarily defined by a user toward the reference pipe, comparing a relative alignment between the aligning pipe and the reference pipe while the circular stage moves along these pipes, and realigning the center point of the aligning pipe by moving the movable plate along three axes when an error occurs.

In accordance with the apparatus and the method for detecting a piping alignment using image information and a laser sensor according to an embodiment of the present invention, it is possible to perform the alignment work of the pipes by applying the structure of the fixed plate and the movable plate, and efficiently measure the alignment of the pipes by rotating the laser sensor and the imaging apparatus which are rotated along the ring-type stage, as well as obtain accurate alignment values by analyzing an image acquired from the imaging apparatus.

In addition, according to the present invention, the alignment apparatus used for performing a welding operation of the pipes and beams may automatically align the pipes, thereby reducing a defect rate and improving working efficiency during the welding.

Further, since many pipes mounted on a ship have substantially large size and weight, when using a manual alignment apparatus, an operation time is increased and an accuracy of the alignment process is deteriorated. However, according to the present invention, by using the automatic pipe alignment apparatus, it is possible to reduce the operation time and improve the accuracy thereof.

Furthermore, according to the present invention, fluid machine and system makers, and piping makers other than related to the shipping industry, often have a poor working environment in a small scale, and when the automatic alignment apparatus is used by such makers, it is possible to improve an enterprise competitiveness due to a decrease in production costs resulting from a reduction in the entire production time, and an increase in the durability of the products.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail. The following embodiments are described in order to enable those of ordinary skill in the art to embody and practice the present invention. However, the present invention is not limited to the embodiments disclosed below, but can be implemented in various forms. To aid in understanding the present invention, like numbers refer to like elements throughout the description of the drawings, and the description of the same elements will not be described.

In the specification, when the explanatory phrase a part "includes" a component is used, this means that the part may further include the component without excluding other components, so long as special explanation is not given.

Figure 1:
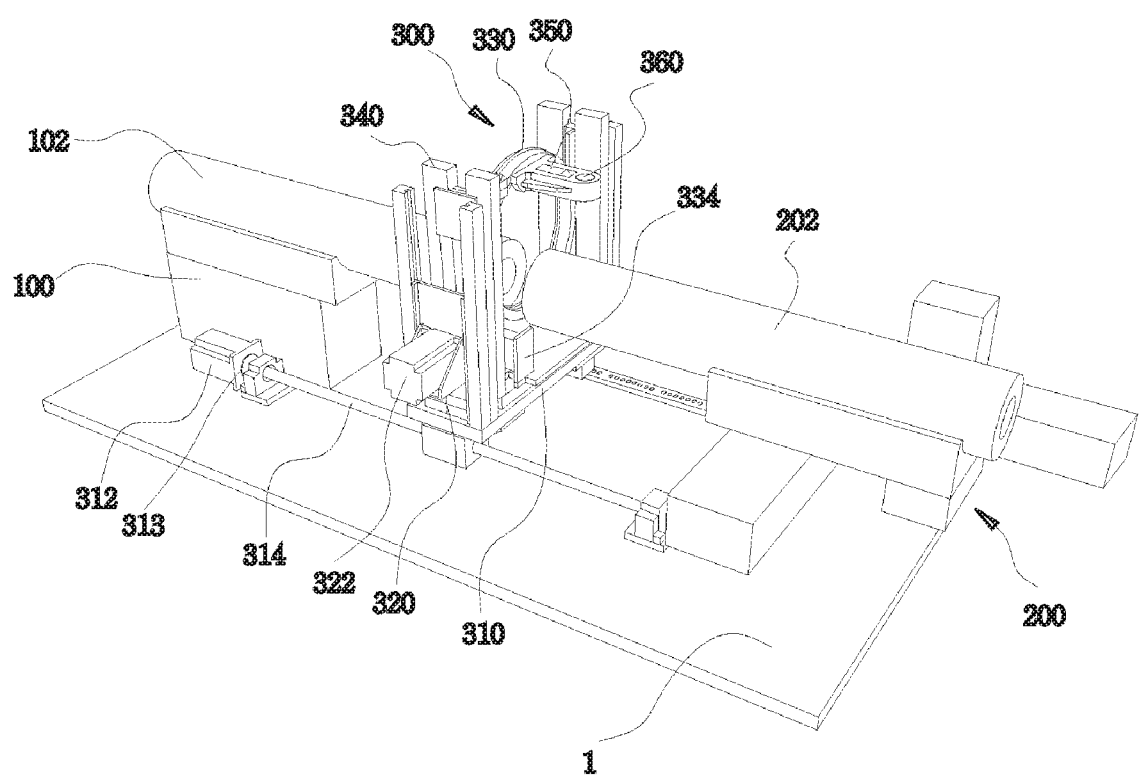
FIG. 1 is a schematic perspective view of an apparatus for detecting a piping alignment according to an embodiment of the present invention.
Figure 2:
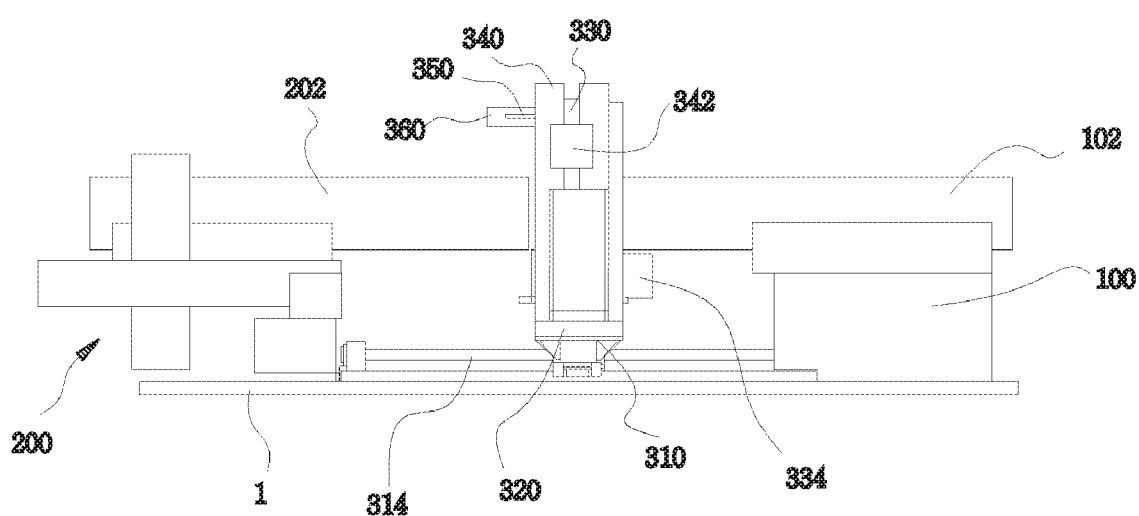
FIG. 2 is a rear view of the apparatus for detecting a piping alignment according to the embodiment of the present invention.
Figure 3:
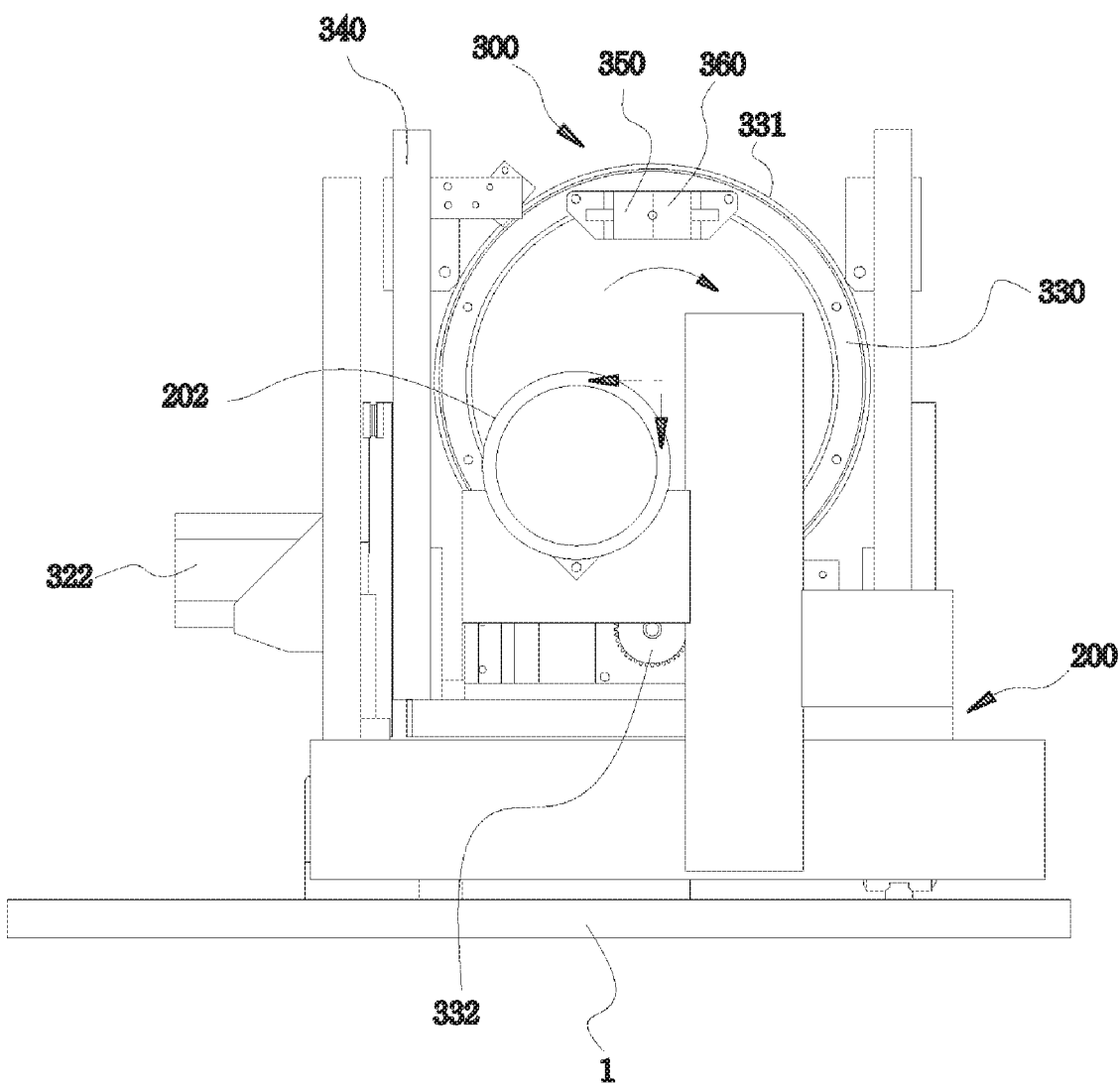
FIG. 3 is a side view of the apparatus for detecting a piping alignment according to the embodiment of the present invention.
Figure 4:
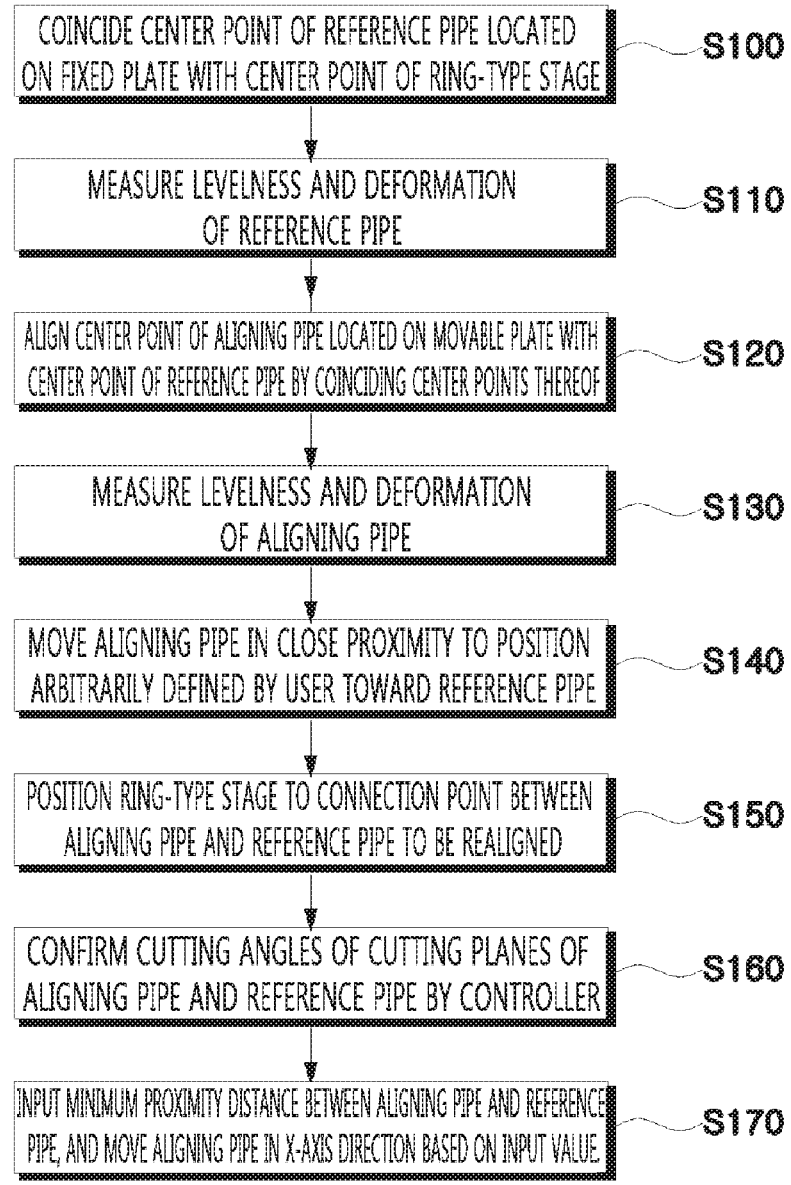
FIG. 4 is a flowchart of a method for detecting a piping alignment according to the embodiment of the present invention.

FIG. 1 is a schematic perspective view of an apparatus for detecting a piping alignment according to an embodiment of the present invention, FIG. 2 is a rear view of the apparatus for detecting a piping alignment according to the embodiment of the present invention, FIG. 3 is a side view of the apparatus for detecting a piping alignment according to the embodiment of the present invention, and FIG. 4 is a flowchart of a method for detecting a piping alignment according to the embodiment of the present invention.

As illustrated in FIGS. 1 to 3, an apparatus for detecting a piping alignment according to the present invention may include a base stage 1, a fixed plate 100 installed on the base stage 1 and having a reference pipe 102 mounted thereon, a movable plate 200 movably installed on the base stage 1 to face the fixed plate 100 at an interval and having an aligning pipe 202 mounted thereon, a circular stage 300 located between the fixed plate 100 and the movable plate 200, a laser sensor 350 and an imaging device 360 which are installed on the circular stage 300, and a controller configured to collect data acquired from the laser sensor 350 and the imaging device 360 and determine a piping alignment.

First, the base stage 1 may have a rectangular or polygonal flat plate shape, and may be made of a metallic material.

The fixed plate 100 and the movable plate 200 are installed on the base stage 1 so as to face each other at an interval. Herein, the fixed plate 100 is fixed to the base stage 1, while the movable plate 200 may be movably installed thereon to move along three axes (i.e., X, Y and Z axes).

The fixed plate 100 and the movable plate 200 may be formed as a block having a "V-shaped" upper surface within an angle of 140° to 160° so as to increase a contact area between the upper surface and the reference pipe 102 or the aligning pipe 202, respectively. In this case, the reference pipe 102 and the aligning pipe 202 may be fixed to the V-shaped upper surface by means of a fixing means (not illustrated) such as an adhesive band for increasing adhesiveness therebetween so as to prevent a positional movement of these pipes mounted thereon.

Although the movable plate 200 is illustrated as a block in the rear view of FIG. 2, the movable plate 200 may be provided with conventional driving motors so as to move forward and backward in a longitudinal direction (X-axis direction), horizontally move in a lateral direction (Y-axis direction), and move up and down in a vertical direction (Z-axis direction).

Further, the horizontal movement and the vertical (upward/downward) movement of the movable plate 200 may be precisely controlled through a servo motor, or the like so as to be finely moved in horizontal and vertical directions.

The circular stage 300 installed so as to be located between the fixed plate 100 and the movable plate 200 is moved and located so as to coincide a center point thereof with a center point of the reference pipe 102 located on the fixed plate 100, and may help the aligning pipe 202 so as to coincide a center point thereof with the center point of the reference pipe 102 by the movement of the movable plate 200 based on the center point. In this state, it is possible to confirm levelness and deformations of the reference pipe 102 and the aligning pipe 202 by the controller.

The circular stage 300 may include a stage 310 configured to move the same in the X-axis direction as a whole, a sliding stage 320 installed on the stage 310 to move in the Z-axis direction on the stage 310, and a circular body 330 installed on the sliding stage 320 so as to be able to rotate and move in the Y-axis direction.

A driving motor 312 and a motor shaft 313 are installed on the base stage 1 in order to move the entire circular stage 300 in the X-axis direction, that is, in the longitudinal direction, and a ball screw shaft 314 is connected and fixed to an end of the motor shaft 313 so as to be rotatably installed above the base stage 1 by the driving motor 312. A portion of the stage 310 is screw-coupled to the ball screw shaft 314, thereby allowing the entire circular stage 300 to be moved along the ball screw shaft 314 in the longitudinal direction.

The drive motor 312 may be capable of forward and reverse rotation.

The sliding stage 320 including the circular body 330 may be installed on the stage 310 through a rail, or the like so as to be moved along the Z-axis by a cylinder 322 or the driving motor.

The circular body 330 has gear teeth 331 formed on an outer periphery thereof. A driving gear 332 meshed with the gear teeth 331 in a form of a spur gear is installed in the circular stage 300, and a rotary motor 334 may be installed to the driving gear 332 so as to rotate the circular body 330.

Elevator columns 340 may be installed on both sides of the circular body 330, and an elevator apparatus 342 may be installed thereon for allowing the circular body 330 to be moved up and down along the elevator column 340.

The elevator apparatus 342 may include a motor or a cylinder.

The laser sensor 350 installed on an upper side of the circular stage 300 horizontally irradiates a laser beam toward the front and receives the laser beam reflected by a target object, which is commonly used in the art, and therefore will not be additionally described in detail.

The imaging device 360 may include a charge coupled device (CCD) image sensor, or a complementary metal oxide semiconductor (CMOS) image sensor, which are capable of photographing an image to acquire information.

The controller (not illustrated in the drawings) may be connected to the circular stage 300 via a wired or wireless connection. The controller is configured to receive a distance value of a gap between the reference pipe 102 and the aligning pipe 202 measured by the laser sensor 350 to collect data, and calculate a corresponding relationship between the image information acquired from the imaging device 360 and distance information of the gap to determine the levelness of the reference pipe 102 and the aligning pipe 202, and may include a separate display device connected thereto via a wired or wireless connection.

The display device may be a personal computer, a mobile device, or a tablet PC, and may display the levelness of the pipes by performing a coordinate conversion of a corresponding relation between the image information and the distance information.

In addition, the display device of the controller may be equipped with a software program that can process an image by performing the coordinate conversion, and may have functions to analyze, record, and generate data, as well as manage a history of the data, input the measured information, and report results thereof.

Next, a method for detecting a piping alignment using the image information and the laser sensor according to the present invention using the apparatus for detecting a piping alignment having the above-described configuration will be described with reference to FIG. 4.

As illustrated in FIG. 4, the method for detecting a piping alignment according to the present invention may include the steps of: coinciding a center point of the reference pipe located on the fixed plate with a center point of the circular stage provided with a laser sensor and an imaging device (S100); measuring a levelness and a deformation of the reference pipe while the circular stage rotates 360° and moves on an X-axis along the fixed plate with the center points of the circular stage and the reference pipe being coincided with each other (S110); aligning a center point of an aligning pipe located on a movable plate with the center point of the reference pipe by coinciding the center points thereof with each other by moving the movable plate along three axes using center point coordinate information of the circular stage (S120); measuring a levelness and a deformation of the aligning pipe while the circular stage rotates 360° and moves on an X-axis along the movable plate with the center points of the circular stage and the aligning pipe being coincided with each other (S130); moving the aligning pipe in close proximity to a position arbitrarily defined by a user toward the reference pipe (S140); positioning the circular stage to a connection point between the aligning pipe and the reference pipe facing in close proximity to each other (S150); confirming cutting angles of cutting planes of the aligning pipe and the reference pipe by a controller through the 360° rotation operation of the circular stage (S160); inputting a minimum proximity distance between the aligning pipe and the reference pipe according to conditions of the cutting planes of the aligning pipe and the reference pipe; and moving the aligning pipe in an X-axis direction based on the input value (S170). The method for detecting a piping alignment may further include the step of: after step S140, comparing a relative alignment between the aligning pipe and the reference pipe while the circular stage moves along these pipes, and realigning the center point of the aligning pipe by moving the movable plate along three axes when an error occurs (S150).

First, the reference pipe 102 is located on the "V"-shaped upper surface of the fixed plate 100 in the longitudinal direction, and then the position thereof is fixed by a fixing means. In addition, the aligning pipe 202 is also located and fixed to the V-shaped upper surface of the movable plate 200 as described above.

Then, the step of coinciding the central point of the reference pipe 102 located and fixed to the fixed plate 100 and the center point of the circular stage 300 with each other is performed (S100).

As illustrated in FIG. 3, since the center point of the reference pipe 102 and the center point of the circular stage 300 are different from each other at an initial state, the stage 310 is moved toward the reference pipe 102 along the ball screw shaft 314 to be included inside thereof, then the distance of the gap between the aligning pipe 202 and the reference pipe 102 acquired from the laser sensor 350 and the imaging device 360 is measured by the controller while the circular body 330 having the gear teeth 331 meshed with the driving gear 332 is rotated 360° (one revolution) about the reference pipe 102 by the rotary motor 334. Based on the measured distance, the center points of the reference pipe 102 and the circular body 330 are coincided with each other while moving the sliding stage 320 and the circular body 330 along three axes (in step S100).

Then, in step S110, the levelness and the deformation of the reference pipe 102 are measured while the circular body 330 rotates 360° by the driving of the rotary motor 334 along the reference pipe 102 fixed to the fixed plate 100 and moves on an X-axis along the ball screw shaft 314 with the center points of the circular body 330 and the reference pipe 102 being coincided with each other.

Herein, while the stage 310 is repeatedly moved along the reference pipe 102 by a preset distance, that is, for example, if the preset moving distance is 5 cm, a distance between the aligning pipe 202 and the reference pipe 102 located inside the circular body 330 is determined by the laser sensor 350 to measure the levelness or deformation of the reference pipe 102.

Next, in step S120, the center point of the aligning pipe 202 located on the movable plate 200 and the center point of the reference pipe 102 are coincided with each other, while the movable plate 200 moves along the X, Y and Z axes based on the center point coordinate information of the circular stage 300.

In step S130, as similar to step S110, the levelness and the deformation of the aligning pipe 202 are measured while the circular body 330 rotates 360° by the driving of the rotary motor 334 along the aligning pipe 202 fixed to the movable plate 200 and moves on an X-axis along the ball screw shaft 314 with the center points of the circular body 330 and the aligning pipe 202 being coincided with each other.

In step S140, the aligning pipe 202 located on the movable plate 200 moves in close proximity to a position arbitrarily defined by the user toward the reference pipe 102 in the X-axis direction.

Further, the step S150 is a step of realigning the reference pipe 102 and the aligning pipe 202 after step S140. In particular, as similar to steps S110 and S130, the relative alignment between the aligning pipe 202 and the reference pipe 102 is compared by the controller while the circular stage 300 moves along these pipes, and the center point of the aligning pipe 202 is realigned by moving the movable plate 200 along three axes when an error occurs.

In steps S160 and S170, the circular stage 300 is positioned to a connection point between the aligning pipe 202 and the reference pipe 102 facing in close proximity to each other, then the cutting angles of cutting planes of the aligning pipe 202 and the reference pipe 102 are confirmed by the controller through the 360° rotation operation of the circular body 330, and then, unless the two opposite cutting planes are not perpendicular with each other according to conditions of the cutting planes of the aligning pipe 202 and the reference pipe 102, a minimum proximity distance between the aligning pipe 202 and the reference pipe 102 is input by the controller, and the aligning pipe 202 moves in the X-axis direction based on the input value.

Thereafter, when the alignment operation is completed, the circular stage 300 returns to an initial position and the operation is ended.

Therefore, as described above, according to the present invention, it is possible to efficiently measure the alignment of the pipes, and analyze the acquired image to obtain an accurate alignment value. As a result, it is possible to automatically perform the alignment work of the pipes, thereby reducing the defect rate and improve the working efficiency during the welding.

Further, since many pipes mounted on a ship have substantially large size and weight, when using a manual alignment apparatus, an operation time is increased and an accuracy of the alignment process is deteriorated. However, according to the present invention, by using the automatic pipe alignment apparatus, it is possible to reduce the operation time and improve the accuracy thereof.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

DESCRIPTION OF REFERENCE NUMERALS

1: base stage, 100: fixed plate
102: reference pipe, 200: movable plate
202: aligning pipe, 300: circular stage
310: stage, 320: sliding stage
330: circular body, 340: elevator column
350: laser sensor, 360: imaging device

What is claimed is:
1. A method for detecting a piping alignment using image information and a laser sensor, the method comprising the steps of:
coinciding a center point of a reference pipe located on a fixed plate with a center point of a circular stage provided with a laser sensor and an imaging device through rotation and movement along three axes of the circular stage;
measuring a levelness and a deformation of the reference pipe while the circular stage rotates 360° and moves on an X-axis along the fixed plate with the center points of the circular stage and the reference pipe being coincided with each other;
aligning a center point of an aligning pipe located on a movable plate with the center point of the reference pipe by coinciding the center points thereof with each other by moving the movable plate along three axes using center point coordinate information of the circular stage;
measuring a levelness and a deformation of the aligning pipe while the circular stage rotates 360° and moves on an X-axis along the movable plate with the center points of the circular stage and the aligning pipe being coincided with each other;

moving the aligning pipe in close proximity to a position arbitrarily defined by a user toward the reference pipe;

positioning the circular stage to a connection point between the aligning pipe and the reference pipe facing in close proximity to each other, then confirming cutting angles of cutting planes of the aligning pipe and the reference pipe by a controller through the 360° rotation operation of the circular stage; and inputting a minimum proximity distance between the aligning pipe and the reference pipe according to conditions of the cutting planes of the aligning pipe and the reference pipe, and moving the aligning pipe in an X-axis direction based on the input value.

2. The method according to claim 1, wherein, in the step of coinciding the center point of the reference pipe located on the fixed plate with the center point of the circular stage, the center point of the circular stage is coincided with the center point of the reference pipe, while the circular stage rotates 360° about the reference pipe and circular stage moves along three axes, using a distance measured by the laser sensor.

3. The method according to claim 1, wherein, in the step of measuring the levelness and the deformation of the reference pipe, while the circular stage is repeatedly moved along the reference pipe by a preset distance, a distance between the aligning pipe and the reference pipe located inside the circular body is determined to measure the levelness or deformation of the reference pipe.

4. The method according to claim 1, wherein, in the step of measuring the levelness and the deformation of the aligning pipe, while the circular stage is repeatedly moved along the aligning pipe by a preset distance, a distance between the reference pipe and the aligning pipe located inside the circular body is determined to measure the levelness or deformation of the aligning pipe.

5. The method according to claim 1, further comprising, after the step of moving the aligning pipe in close proximity to a position arbitrarily defined by a user toward the reference pipe, comparing a relative alignment between the aligning pipe and the reference pipe while the circular stage moves along these pipes, and realigning the center point of the aligning pipe by moving the movable plate along three axes when an error occurs.

* * * * *